United States Patent
Srinivasan et al.

(10) Patent No.: US 11,693,720 B1
(45) Date of Patent: Jul. 4, 2023

(54) DEPLOYING SCHEMATICALLY ENRICHED DOCUMENT CONTENT AS REPRESENTATIONAL STATE TRANSFER APPLICATION PROGRAMMING INTERFACES

(71) Applicant: International Business Machines Corporation, Armonk, NY (US)

(72) Inventors: Aparna Srinivasan, Chennai (IN); Balaji Sankar Kumar, Bengaluru (IN); Hemalatha Rajendran, Bengaluru (IN); Vivekmani TSK, Namakkal (IN)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 17/648,317

(22) Filed: Jan. 19, 2022

(51) Int. Cl.
*G06F 9/44* (2018.01)
*G06F 9/54* (2006.01)
*H04L 67/00* (2022.01)

(52) U.S. Cl.
CPC .............. *G06F 9/547* (2013.01); *H04L 67/34* (2013.01)

(58) Field of Classification Search
CPC ....................................................... G06F 9/547
USPC ......................................................... 719/328
See application file for complete search history.

(56) References Cited

U.S. PATENT DOCUMENTS

| | | | |
|---|---|---|---|
| 8,819,629 | B2 | 8/2014 | Sherrill |
| 9,256,583 | B2 | 2/2016 | Caten |
| 10,372,744 | B2 | 8/2019 | Kumar et al. |
| 10,761,838 | B2 | 9/2020 | Roy et al. |
| 11,074,067 | B2 | 7/2021 | Pollock |
| 2020/0184278 | A1* | 6/2020 | Zadeh ................. G06N 3/044 |
| 2021/0049222 | A1* | 2/2021 | Pascente ............ G06F 16/9535 |
| 2021/0157858 | A1* | 5/2021 | Stevens ............ G06F 16/90335 |

OTHER PUBLICATIONS

Anonymous, "Automatic Augmented Documentation Generation Technique," An IP.com Prior Art Database Technical Disclosure, IPCOM000266487D, Jul. 19, 2021, 5 pages.

* cited by examiner

*Primary Examiner* — Timothy A Mudrick
(74) *Attorney, Agent, or Firm* — Yee & Associates, P.C.

(57) ABSTRACT

Deploying schematically enriched document content as Representational State Transfer (REST) Application Programming Interfaces (APIs) is provided. Nouns corresponding to topics in a parent-child topic hierarchy of a table of contents of a document are utilized to generate a REST API for each topic in the parent-child topic hierarchy. A REST resource model is generated that contains each generated REST API corresponding to each topic in the parent-child topic hierarchy of the table of contents of the document. The REST resource model corresponding to the parent-child topic hierarchy of the table of contents of the document is deployed to subscribing client applications via a network.

20 Claims, 10 Drawing Sheets

TABLE OF CONTENTS
300

304 — Part 1. Introduction..............................................................1
308 — Chapter 1. Our development conditions.........................3
312 — 1.1. Development and deployment tools...........................3
314 — 1.1.1. VisualAge for Java 4.0.........................................4
1.2. WebSphere and J2EE....................................................4

310 — Chapter 2. J2EE overview..................................................7
2.1. What is J2EE?................................................................8
316 — 2.2. Application components...............................................8
318 { 2.2.1. Application clients..................................................9
2.2.2. Applets...................................................................10
2.2.3. Servlets and JavaServer Pages..........................10

PARENT-CHILD TOPIC HIERARCHY 302 o
o
o

306 — Part 2. The EJB container...............................................37
320 — Chapter 5. Working with Enterprise JavaBeans............39
322 — 5.1. EJB specification........................................................40
326 { 5.1.1. EJB container.......................................................41
5.1.2. EJB composition...................................................43
5.1.3. PiggyBank scenario..............................................48
5.2. Session beans..............................................................50
324 — 5.3. Entity beans.................................................................56
328 { 5.3.1. Examining CMP....................................................58
5.3.2. Examining BMP....................................................62

FIG. 3

NOUN AND VERB
IDENTIFICATION PROCESS
400

Part 1. Introduction------------->Noun

Chapter 1. Our development conditions--------->Noun

1.1. Development and deployment tools--------->Noun          1.1.1. VisualAge forJava4.0--------->Noun       1.2. WebSphere and J2EE--------->Noun    Chapter 2. J2EE overview----------->Noun       2.1. What is J2EE---------->Noun       2.2. Application components----------->Noun          2.2.1. Application clients----------->Noun          2.2.2. Applets----------->Noun          2.2.3. Servlets and JavaServer Pages----------->Noun             ○
            ○
410            ○

Part 2. The EJB container------------->Noun

Chapter 5. Working with Enterprise JavaBeans------------->Verb and Noun      404  5.3. Entity Beans-------->Noun          5.3.1. Examining CMP-------->Verb and Noun
      406
         5.3.2. Examining BMP-------->Verb and Noun            408

PARENT-CHILD
TOPIC HIERARCHY
402

MODIFIED PARENT-CHILD
TOPIC HIERARCHY
800

Part 1. Introduction

Chapter 1. Our development conditions

1.1. deployment tools

1.1.1. VisualAge for Java4.0

1.2. WebSphere and J2EE

Chapter 2. J2EE overview

2.1. What is

2.2. Application components

2.2.1. clients             2.2.2. Applets             2.2.3. Servlets and JavaServer Pages
                ○
                ○
                ○

Part 2. The EJB container

Chapter 5. Work with Enterprise JavaBeans

5.3. Entity Beans

5.3.1. Examination                 5.3.1.1. CMP                 5.3.1.2. BMP

DEPLOYING SCHEMATICALLY ENRICHED DOCUMENT CONTENT AS REPRESENTATIONAL STATE TRANSFER APPLICATION PROGRAMMING INTERFACES

BACKGROUND

1. Field:

The disclosure relates generally to application programming interfaces and more specifically to deploying schematically enriched document content as representational state transfer application programming interfaces.

2. Description of the Related Art:

An Application Programming Interface (API) is a set of rules that define how applications on computer systems or other types of data processing systems, which are connected via a network, communicate with one another. An API is positioned between a client application and a web server, acting as an intermediary layer that processes data transfer between systems. For example, a client application initiates an API call (e.g., a request) to retrieve information from a web server. This request is processed from an application on a client device to the web server via the API's Uniform Resource Identifier. The web server sends a response with the requested information to the API. The API then transfers the requested information to the client application.

Representational State Transfer (REST) is a set of guidelines that applications can use to communicate over the Internet. A REST API is a specific type of API that follows the REST set of guidelines. This means that when a client application requests a resource (e.g., information) using a REST API, the web server transfers back the current state of the resource in a standardized representation. In other words, a REST API works by receiving a request for a resource and returning the resource, translated into a format that the requesting client application can use. REST APIs are stateless, meaning that each resource request includes all the information necessary for processing that resource request.

SUMMARY

According to one illustrative embodiment, a computer-implemented method for deploying schematically enriched document content as Representational State Transfer (REST) Application Programming Interfaces (APIs) is provided. A computer utilizes nouns corresponding to topics in a parent-child topic hierarchy of a table of contents of a document to generate a REST API for each topic in the parent-child topic hierarchy. The computer generates a REST resource model that contains each generated REST API corresponding to each topic in the parent-child topic hierarchy of the table of contents of the document. The computer deploys the REST resource model corresponding to the parent-child topic hierarchy of the table of contents of the document to subscribing client applications via a network. According to other illustrative embodiments, a computer system and computer program product for deploying schematically enriched document content as REST APIs are provided.

DETAILED DESCRIPTION

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
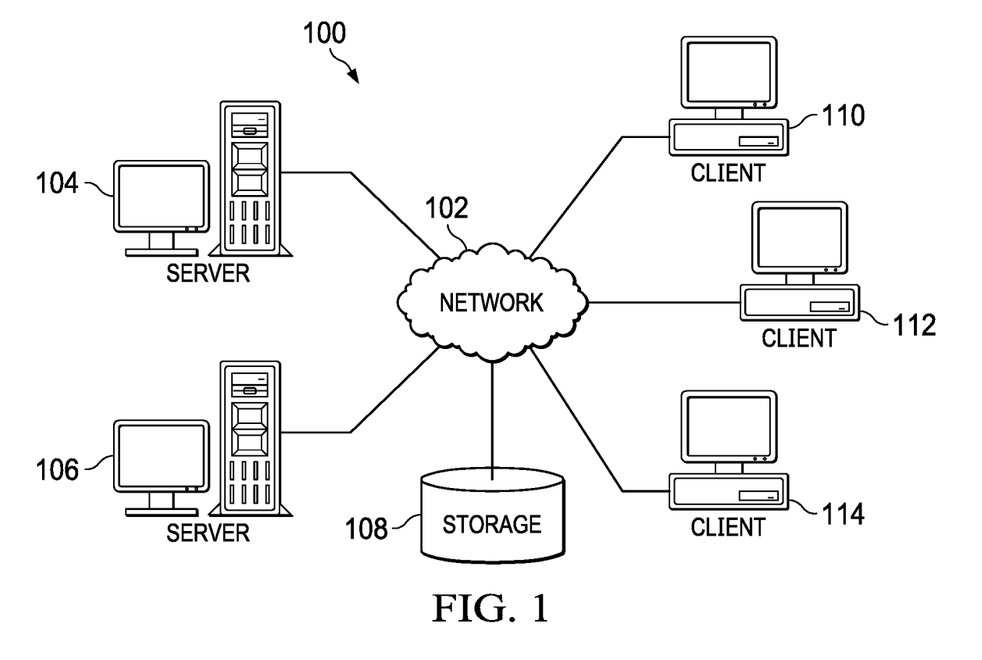
FIG. 1 is a pictorial representation of a network of data processing systems in which illustrative embodiments may be implemented.
Figure 2:
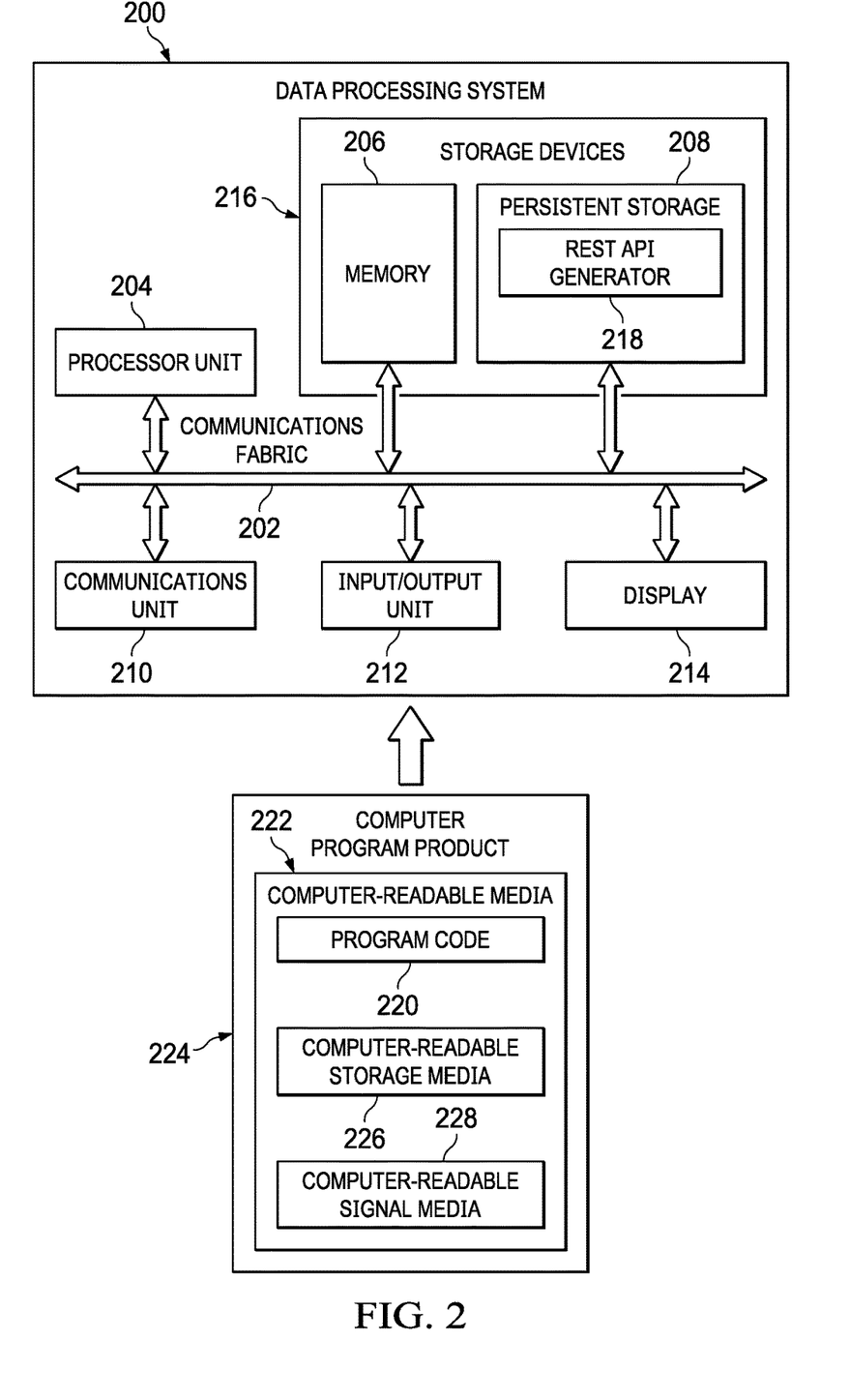
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 provide one or more information retrieval services to subscribing client applications on client devices corresponding to information consumers. Further, server 104 and server 106 provide the information retrieval services by deploying schematically enriched document content as REST APIs within a REST resource model to the subscribing client applications. Each respective REST API included in the REST resource model executes a request to retrieve particular content (e.g., chapter, section, topic, paragraph, sentence, or the like) of the document and not the entire document, itself. Thus, an information consumer, using a subscribing client application on a client device, can request only particular content of a document by selecting a specific REST API in the REST model that corresponds to that particular content.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart glasses, smart televisions, smart vehicles, smart appliances, virtual reality devices, gaming devices, kiosks, and the like, with wire or wireless communication links to network 102. Users of clients 110, 112, and 114 may utilize clients 110, 112, and 114 to access and utilize the information retrieval services provided by server 104 and server 106.

Storage 108 is a network storage device capable of storing any type of data in a structured format or an unstructured format. In addition, storage 108 may represent a plurality of network storage devices. Further, storage 108 may store, for example, identifiers and network addresses for a plurality of subscribing client applications and devices, identifiers for a plurality of client device users, and a plurality of different types of documents such as business documents, educational documents, technical documents, non-technical documents, and the like stored in various formats such as webpage formats, web log formats, portable document formats, chat room formats, social media formats, and the like. Furthermore, storage 108 may store other types of data, such as authentication or credential data that may include usernames, passwords, and the like associated with, for example, client device users, system administrators, and the like.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the REST API generation processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores REST API generator 218. However, it should be noted that even though REST API generator 218 is illustrated as residing in persistent storage 208, in an alternative illustrative embodiment, REST API generator 218 may be a separate component of data processing system 200. For example, REST API generator 218 may be a hardware component coupled to communication fabric 202 or a combination of hardware and software components. In another alternative illustrative embodiment, a first set of components of REST API generator 218 may be located in data processing system 200 and a second set of components of REST API generator 218 may be located in a second data processing system, such as, for example, server 106 in FIG. 1.

REST API generator 218 controls the process of generating a plurality of REST APIs corresponding to different content of a document (e.g., each REST API corresponds to only a specific portion of the document). REST API generator 218 generates the plurality of REST APIs based on nouns identified in a parent-child topic hierarchy of a table of contents corresponding to the document. REST API generator 218 then utilizes the plurality of REST APIs to generate a REST resource model for the document. Afterward, REST API generator 218 deploys the REST resource model to subscribing client applications for accessing specific content of the document by information consumers (e.g., client device users).

As a result, data processing system 200 operates as a special purpose computer system in which REST API generator 218 in data processing system 200 enables generation of REST APIs for retrieving only specific content or information from a document published online instead of retrieving the entire document. In particular, REST API generator 218 transforms data processing system 200 into a special purpose computer system as compared to currently available general computer systems that do not have REST API generator 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Documentation, such as, for example, a product specification document, a technical document, an instructional document, or the like, is typically deployed online in, for example, a web page format, hypertext markup language format, javascript object notation format, portable document format, or the like. These published documents online can be of considerable size. Currently, no mechanism exists to retrieve only a particular chapter, section, or topic of a document published online. Illustrative embodiments provide a service that deploys a published document online as a plurality of REST API calls so that information contained within a particular chapter, section, or topic of the document is easily accessible by any type of requesting client application. Even though different documents are written in various schematic styles, REST has its own schematic style for modeling document content (e.g., information).

Often an enormous amount of documentation exists for a particular product, feature, or functionality across various online mediums. However, when it comes to leveraging this documentation as the actual needed information for different consuming users, such as, for example, software developers, system administrators, business analysts, or the like, from across the various online mediums, no mechanism currently exists that only provides the needed information without providing the entire documentation. As a result, the information consumer has to browse through information contained in each of the various mediums in order to obtain the exact information needed by the consumer. In other words, the consumer when searching for particular information finds it challenging to obtain all the needed information, which requires significant search time and effort by the consumer.

Also, no mechanism currently exists to feed this enormous amount of document information to other applications in order to derive meaningful results from the document information. Further, it should be noted that documentation published online can be updated or changed frequently and these updates or changes may go unnoticed by an information consumer. As a result, the consumer may miss needed information contained in the document updates or changes.

Thus, a need exists for a consumer to be aware of information updates or changes to documentation that the consumer is interested in. Further, a need exists to manage documentation for technical and non-technical information consumers by leveraging the documentation in the form of REST APIs. Schematic (e.g., graphic representation, diagram, or the like) enrichment of this document content as a plurality of REST APIs enables the document content to be consumable by a plurality of different client applications, chatbots, and the like.

Illustrative embodiments retrieve online documentation and perform an analysis of a table of contents corresponding to the documentation using, for example, parsing, syntax analysis, natural language processing, or the like. The table of contents contains a list of names or descriptions of the document's chapters, sections, topics, or the like along with their corresponding page locations in the document. Illustrative embodiments identify one or more nouns and any verbs contained in each respective topic of a parent-child topic hierarchy within the table of contents based on the analysis. Illustrative embodiments then convert each identified verb included in topics of the parent-child topic hierarchy to a corresponding noun. In addition, illustrative embodiments reposition a repeating noun in a plurality of child topics under a current immediate parent topic of the child topics to form a new immediate parent topic for the plurality of child topics within the parent-child topic hierarchy. Further, illustrative embodiments delete a repeated noun located in a child topic that corresponds to a same noun located in an immediate parent topic to that child topic. Illustrative embodiments can also delete conjunctions from topics having deleted nouns. Thus, illustrative embodiments generate a modified parent-child topic hierarchy of the table of contents based on at least one of the identification of nouns and verbs, the converting of verbs to nouns, the repositioning of repeating nouns, the deleting of repeated nouns, or the deleting of conjunctions. Furthermore, illustrative embodiments can convert one or more nouns in the modified parent-child topic hierarchy to a corresponding acronym. Illustrative embodiments utilize remaining nouns corresponding to topics in the modified parent-child topic hierarchy of the table of contents to generate a REST API call for each respective topic in the modified parent-child topic hierarchy.

Afterward, illustrative embodiments generate a REST resource model that contains each generated REST API call for each respective topic in the modified parent-child topic hierarchy of the table of contents corresponding to the document. It should be noted that the hierarchy of the REST resource model is the same as the modified parent-child topic hierarchy of the table of contents. Illustrative embodiments utilize each particular REST API call in the REST resource model to request only the content or information corresponding to that particular topic associated with that particular REST API call. Subsequently, illustrative embodiments deploy the REST resource model corresponding to the modified parent-child topic hierarchy of the table of contents of the document to be consumed by subscribing client applications.

By exposing document content as REST APIs, illustrative embodiments can generate a single view of specific information corresponding to a particular topic in the parent-child topic hierarchy of the table of contents of the document based on a consumer's interest or needs (e.g., selection of the corresponding REST API in the REST resource model by the consumer), without providing the entire document to the consumer, and can manage the document across a plurality of different client applications. Thus, illustrative embodiments increase performance of the computer, itself, by enabling the computer to only provide one specific portion of a document requested by the consumer, instead of providing the entire document, saving computer resources. Illustrative embodiments also increase network performance by decreasing the amount of document content needing to be transferred to the requesting consumer via the network.

Thus, illustrative embodiments provide one or more technical solutions that overcome a technical problem with only providing specific content of a document published online to an information consumer via a network using REST APIs. As a result, these one or more technical solutions provide a technical effect and practical application in the field of REST APIs.

Figure 3:
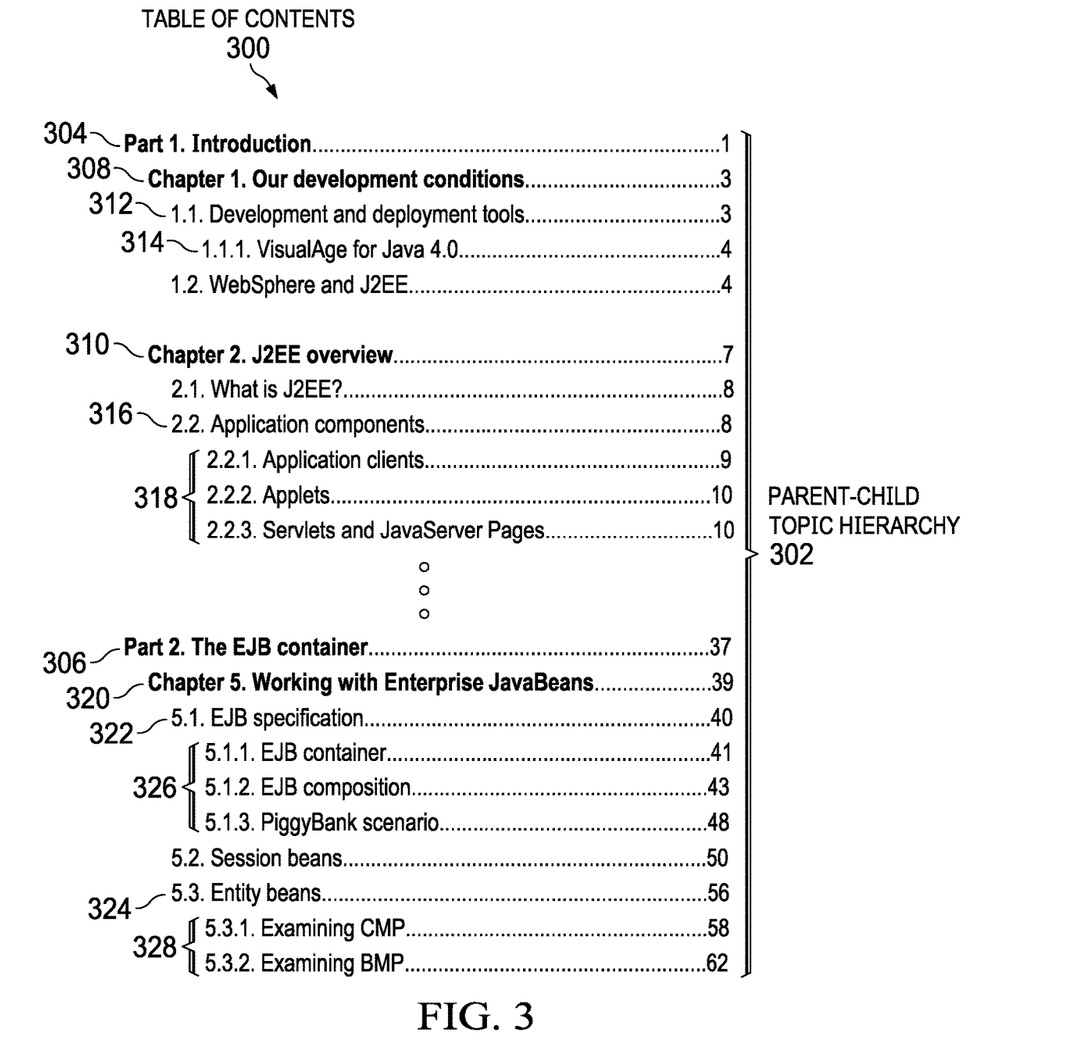
FIG. 3 is a diagram illustrating an example of a table of contents corresponding to a document published online in accordance with an illustrative embodiment.

With reference now to FIG. 3, a diagram illustrating an example of a table of contents corresponding to a document published online is depicted in accordance with an illustrative embodiment. Table of contents 300 may be extracted from the document and analyzed by a computer, such as server 104 in FIG. 1 or data processing system 200 in FIG. 2. For example, REST API generator 218 in FIG. 2 may analyze table of contents 300 to generate REST APIs corresponding to different content of the document.

In this example, table of contents 300 corresponds to a technical document, such as, for example, a document containing information regarding programming APIs. However, it should be noted that table of contents 300 may correspond to any type of documentation, such as, for example, non-technical, technical, educational, instructional, entertainment, or the like. Table of contents 300 includes parent-child topic hierarchy 302. Parent-child topic hierarchy 302 represents the structuring of topics of the document as parent topics and child topics. A parent topic can have any number of child topics. A child topic is indented or shifted to the right underneath an immediate parent topic in parent-child topic hierarchy 302.

For example, table of contents 300 includes Part 1 304 and Part 2 306. Part 1 304 "Introduction" and Part 2 306 "The EJB Container" are parent topics in parent-child topic hierarchy 302. Part 1 304 includes Chapter 1 308 "Our Development Conditions" and Chapter 2 310 "J2EE Overview". Chapter 1 308 and Chapter 2 310 are child topics of immediate parent topic Part 1 304. Chapter 1 308 includes 1.1 312 "Development and Deployment Tools" and 1.1.1 314 "VisualAge for Java 4.0". 1.1 312 is a child topic of immediate parent topic Chapter 1 308 and 1.1.1 314 is a child topic of immediate parent topic 1.1 312. Similarly, Chapter 2 310 includes 2.2 316 "Application Components", which is a child topic of immediate parent topic Chapter 2 310. However, 2.2 316 is an immediate parent topic for child topics 318 (i.e., 2.2.1 "Application Clients", 2.2.2 "Applets", and 2.2.3 "Servlets and JavaServer Pages").

Part 2 306 includes Chapter 5 320 "Working with Enterprise JavaBeans", which is a child topic of immediate parent topic Part 2 306. Chapter 5 320 includes 5.1 322 "EJB Specification" and 5.3 324 "Entity Beans", which are child topics of immediate parent topic Chapter 5 320. Immediate parent topic 5.1 322 includes child topics 326 (e.g., 5.1.1 "EJB Container", 5.1.2 "EJB Composition", and 5.1.3 "PiggyBank Scenario") and immediate parent topic 5.3 includes child topics 328 (e.g., 5.3.1 "Examining CMP" and 5.3.2 "Examining BMP"). Thus, parent-child topic hierarchy 302 shows the parent-child topic structure of table of contents 300 of the document.

Figure 4:
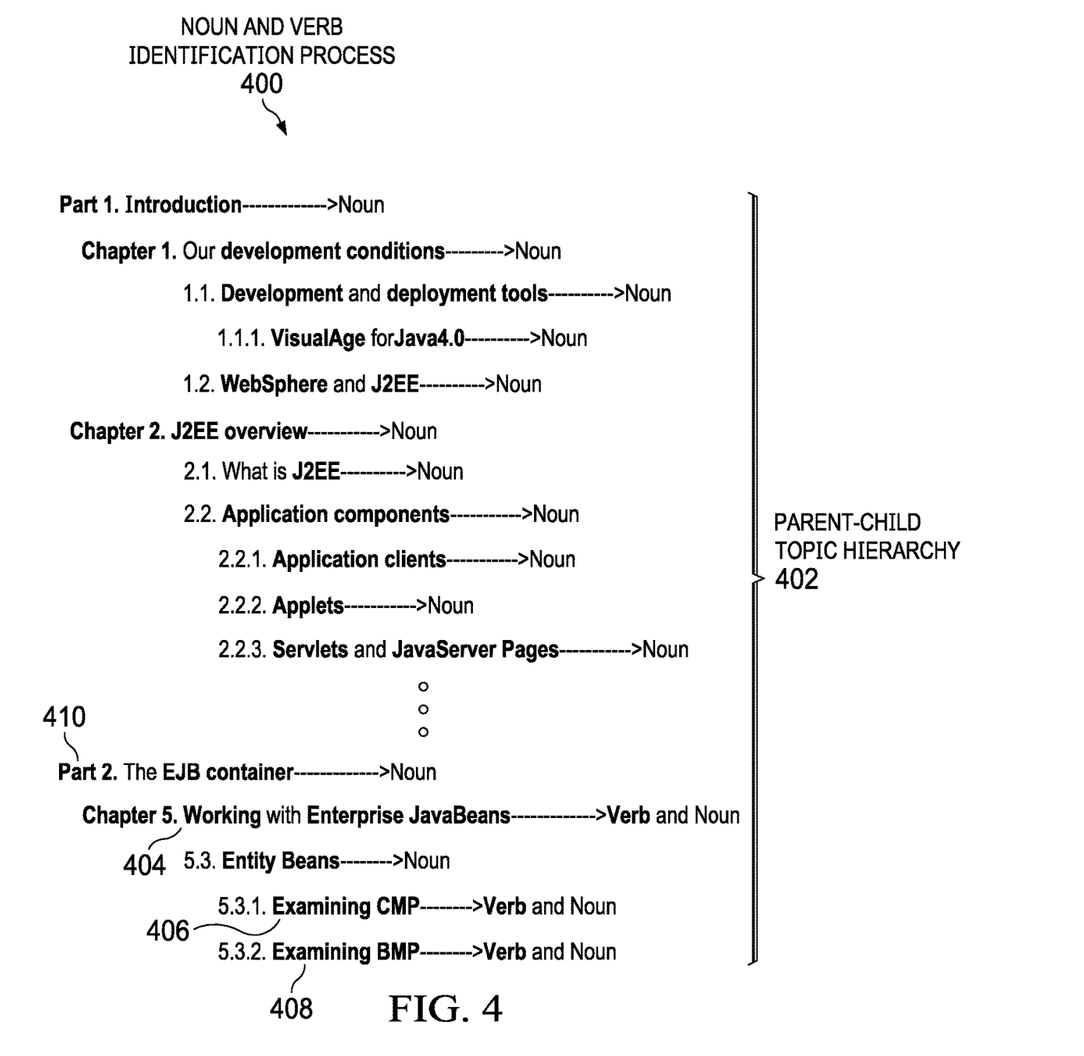
FIG. 4 is a diagram illustrating an example of a noun and verb identification process in accordance with an illustrative embodiment.

With reference now to FIG. 4, a diagram illustrating an example of a noun and verb identification process is depicted in accordance with an illustrative embodiment. Noun and verb identification process 400 may be implemented in a computer, such as, for example, server 104 in FIG. 1 or data processing system 200 in FIG. 2. For example, noun and verb identification process 400 may be implemented in a REST API generator such as REST API generator 218 in FIG. 2.

Noun and verb identification process 400 utilizes parent-child topic hierarchy 402 to identify a set of nouns and verbs contained in each respective topic listed in a table of contents, such as, for example, table of contents 300 in FIG. 3, corresponding to documentation. It should be noted that parent-child topic hierarchy 402 is similar to parent-child topic hierarchy 302 in FIG. 3.

In this example, noun and verb identification process 400 identifies terms contained in parent-child topic hierarchy 402 as nouns (e.g., "Introduction", "Development Conditions", "Development", "Deployment Tools", "VisualAge", "Java4.0", "Websphere", "J2EE", "J2EE Overview", "J2EE", "Application Components", "Application Clients", "Applets", "Servlets", "JavaServer Pages", "EJB Container", "Enterprise JavaBeans", "Entity Beans", "CMP", and "BMP"), except for verb 404 "Working", verb 406 "Examining", and verb 408 "Examining" in Part 2 410. It should be noted that Part 2 410 is similar to Part 2 306 in FIG. 3. Also, it should be noted that noun and verb identification process 400 is capable of identifying acronyms as nouns.

Figure 5:
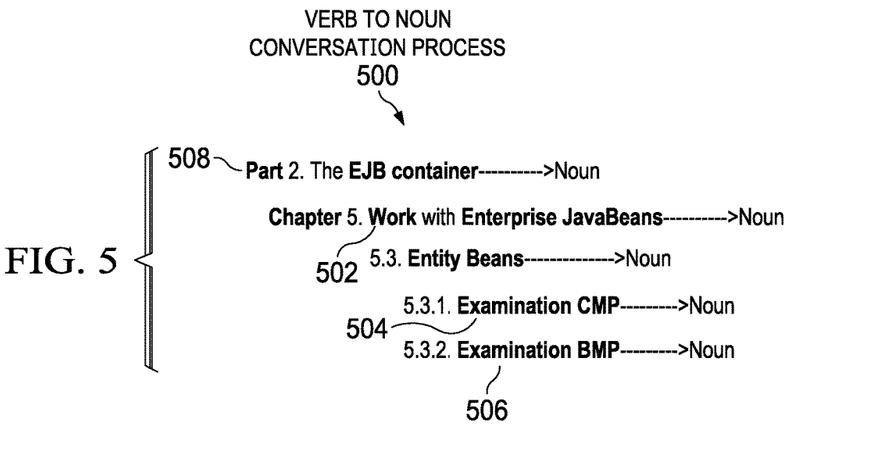
FIG. 5 is a diagram illustrating an example of a verb to noun conversion process in accordance with an illustrative embodiment.

With reference now to FIG. 5, a diagram illustrating an example of a verb to noun conversion process is depicted in accordance with an illustrative embodiment. Verb to noun conversion process 500 may be implemented in a computer, such as, for example, server 104 in FIG. 1 or data processing system 200 in FIG. 2. For example, verb to noun conversion process 500 may be implemented in a REST API generator such as REST API generator 218 in FIG. 2.

In this example, verb to noun conversion process 500 converts verb 404 "Working", verb 406 "Examining", and verb 408 "Examining" in Part 2 410 of FIG. 4 to corresponding noun 502 "Work", corresponding noun 504 "Examination", and corresponding noun 506 "Examination", respectively. It should be noted that Part 2 508 is similar to Part 2 410 of FIG. 4.

Figure 6:
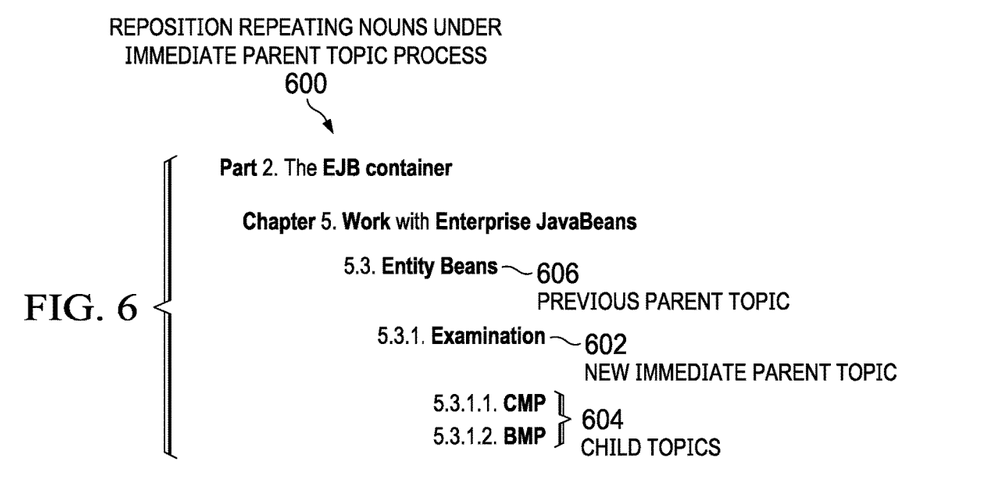
FIG. 6 is a diagram illustrating an example of a reposition repeating nouns under an immediate parent topic process in accordance with an illustrative embodiment.

With reference now to FIG. 6, a diagram illustrating an example of a reposition repeating nouns under an immediate parent topic process is depicted in accordance with an illustrative embodiment. Reposition repeating nouns under immediate parent topic process 600 may be implemented in a computer, such as, for example, server 104 in FIG. 1 or data processing system 200 in FIG. 2. For example, reposition repeating nouns under immediate parent topic process 600 may be implemented in a REST API generator such as REST API generator 218 in FIG. 2.

In this example, reposition repeating nouns under immediate parent topic process 600 places repeating nouns 504 "Examination" and 506 "Examination" under immediate parent topic "Entity Beans" in Part 2 508 of FIG. 5 as new immediate parent topic 602 "Examination" for child topics 604 "CMP" and "BMP" (i.e., the remaining nouns in the child topic group). It should be noted that previous parent topic 606 "Entity Beans" was the immediate parent topic for child topics "Examination CMP" and "Examination BMP" in Part 2 508 in FIG. 5.

Figure 7:
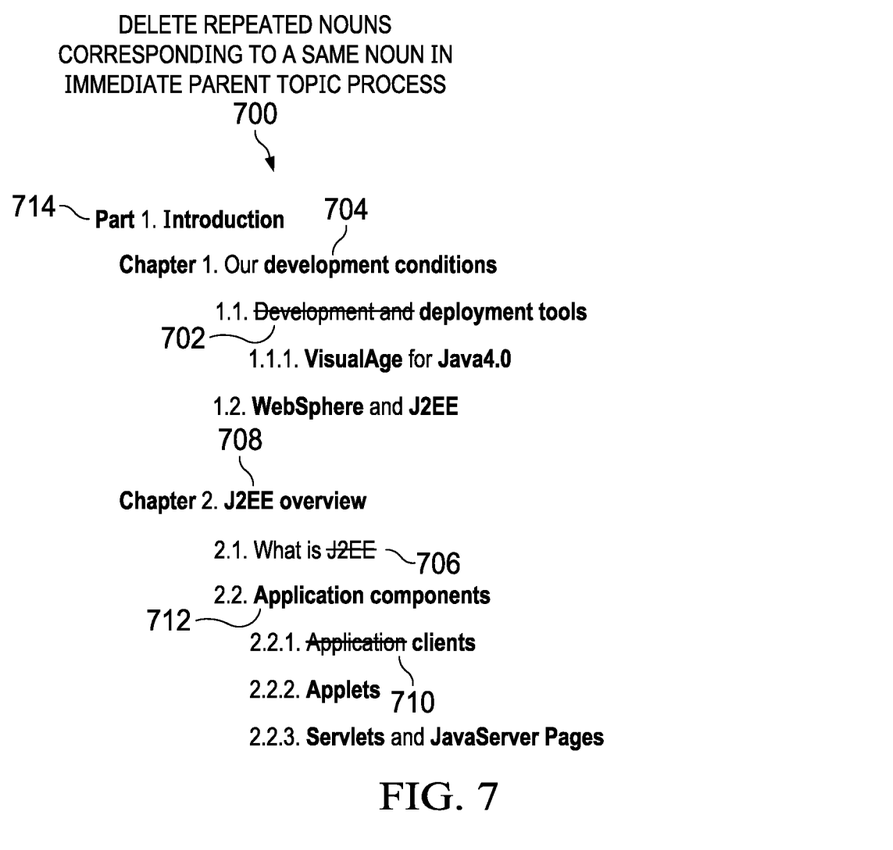
FIG. 7 is a diagram illustrating an example of a delete repeated nouns corresponding to a same noun in an immediate parent topic process in accordance with an illustrative embodiment.

With reference now to FIG. 7, a diagram illustrating an example of a delete repeated nouns corresponding to a same noun in an immediate parent topic process is depicted in accordance with an illustrative embodiment. Delete repeated nouns corresponding to a same noun in immediate parent topic process 700 may be implemented in a computer, such as, for example, server 104 in FIG. 1 or data processing system 200 in FIG. 2. For example, delete repeated nouns corresponding to a same noun in immediate parent topic process 700 may be implemented in a REST API generator such as REST API generator 218 in FIG. 2.

In this example, delete repeated nouns corresponding to a same noun in immediate parent topic process 700 removes repeated noun 702 "Development", which corresponds to same noun 704 "Development" in the immediate parent topic "Development Conditions", from child topic "Development and Deployment Tools". It should be noted that delete repeated nouns corresponding to a same noun in immediate parent topic process 700 also removes the conjunction "and" associated with repeated noun 702. In addition, delete repeated nouns corresponding to a same noun in immediate parent topic process 700 removes repeated noun 706 "J2EE", which corresponds to same noun 708 "J2EE" in the immediate parent topic "J2EE Overview", from child topic "What is J2EE". Similarly, delete repeated nouns corresponding to a same noun in immediate parent topic process 700 removes repeated noun 710 "Application", which corresponds to same noun 712 "Application" in the immediate parent topic "Application Components", from child topic "Application Clients". It should be noted that Part 1 714 is similar to Part 1 304 in FIG. 3.

Figure 8:
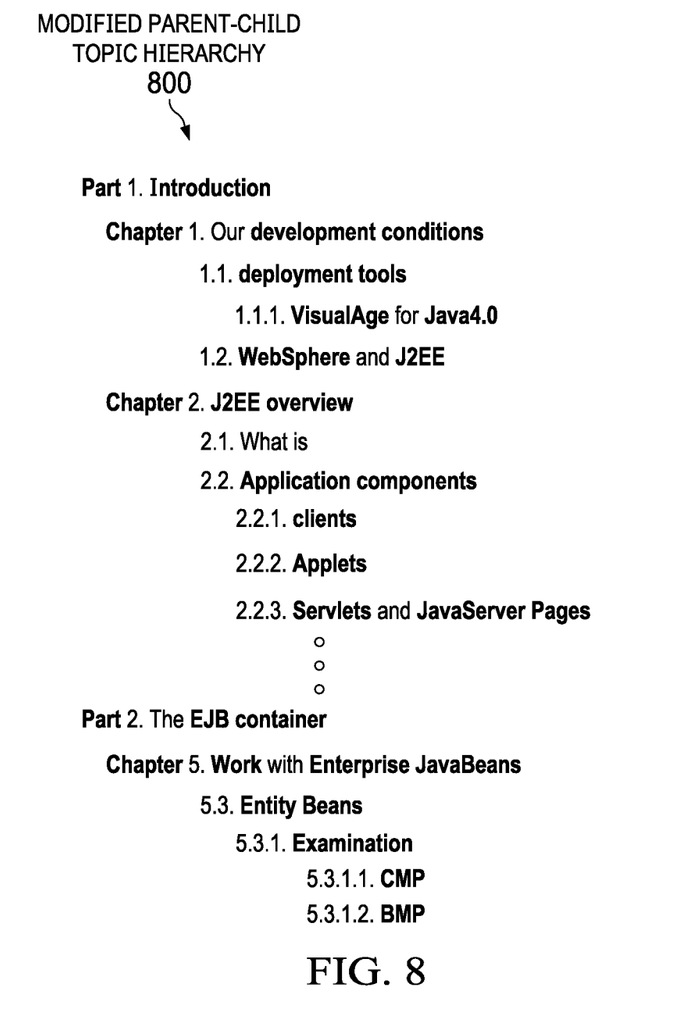
FIG. 8 is a diagram illustrating an example of a modified parent-child topic hierarchy corresponding to a table of contents of a document in accordance with an illustrative embodiment.

With reference now to FIG. 8, a diagram illustrating an example of a modified parent-child topic hierarchy corresponding to a table of contents of a document is depicted in accordance with an illustrative embodiment. Modified parent-child topic hierarchy 800 may be implemented in a computer, such as, for example, server 104 in FIG. 1 or data processing system 200 in FIG. 2. For example, modified parent-child topic hierarchy 800 may be implemented in a REST API generator such as REST API generator 218 in FIG. 2.

In this example, the REST API generator forms modified parent-child topic hierarchy 800 based on performing noun and verb identification process 400 in FIG. 4, verb to noun conversion process 500 in FIG. 5, reposition repeating nouns under immediate parent topic process 600 in FIG. 6, and delete repeated nouns corresponding to a same noun in immediate parent topic process 700 in FIG. 7. It should be noted that modified parent-child topic hierarchy 800 is a revised version of parent-child topic hierarchy 402 in FIG. 4.

Figure 9:
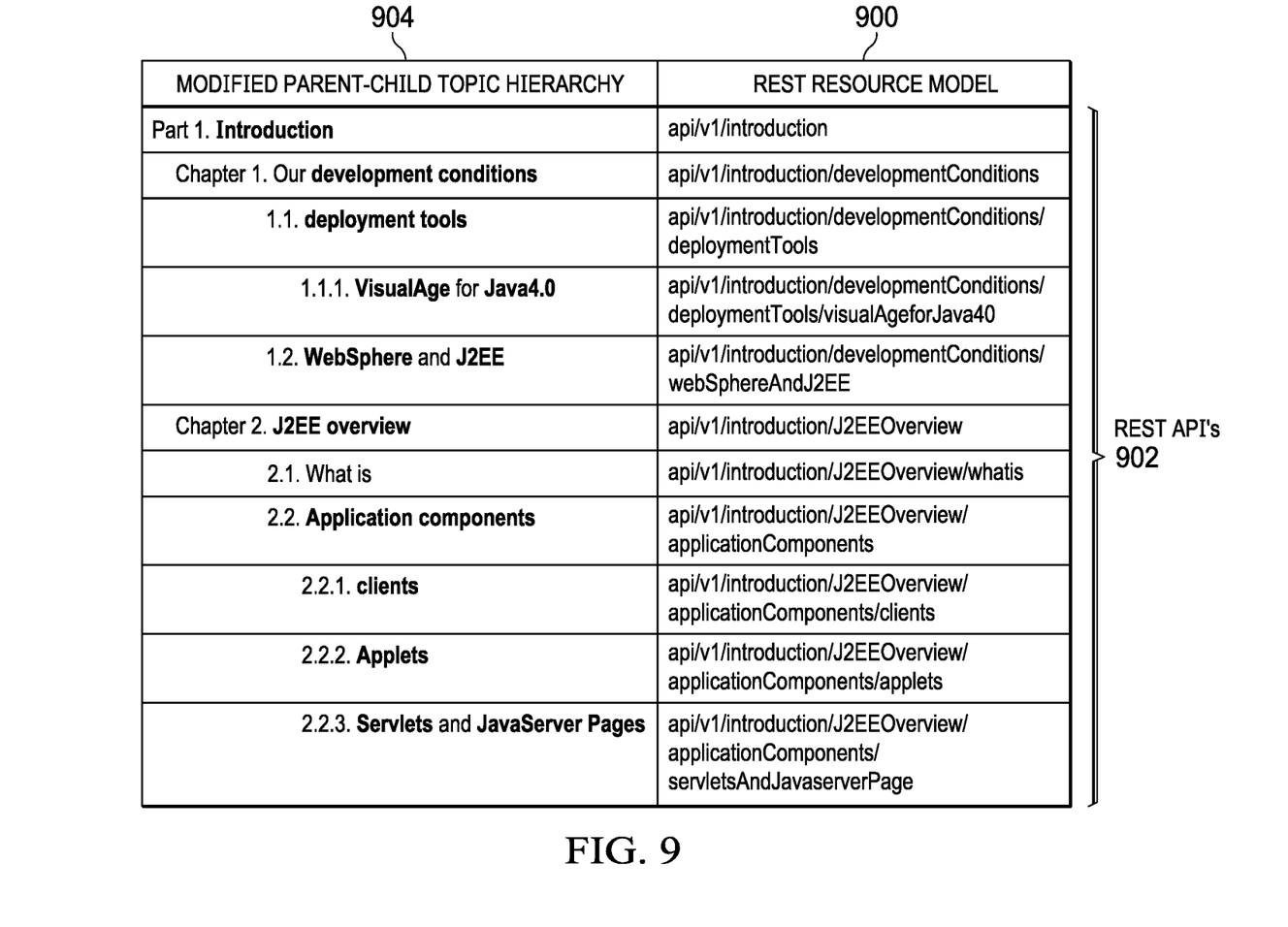
FIG. 9 is a diagram illustrating an example of a REST resource model corresponding to a modified parent-child topic hierarchy of a table of contents of a document in accordance with an illustrative embodiment.

With reference now to FIG. 9, a diagram illustrating an example of a REST resource model corresponding to a modified parent-child topic hierarchy of a table of contents of a document is depicted in accordance with an illustrative embodiment. REST resource model 900 may be implemented in a computer, such as, for example, server 104 in FIG. 1 or data processing system 200 in FIG. 2. For example, REST resource model 900 may be implemented in a REST API generator such as REST API generator 218 in FIG. 2.

In this example, REST resource model 900 is comprised of REST APIs 902. The REST API generator utilizes the remaining nouns of topics in modified parent-child topic hierarchy 904 to generate REST APIs 902. It should be noted that modified parent-child topic hierarchy 904 is similar to modified parent-child topic hierarchy 800 in FIG. 8. Also, it should be noted that each respective REST API of REST APIs 902 corresponds to a particular topic in modified parent-child topic hierarchy 904. In other words, activation of a particular REST API in REST resource model 900 will retrieve content of the corresponding topic. For example, GET: "api/v1/introductionAPI" returns only the content that is mapped to the "Part 1. Introduction" portion of the document. Further, the REST API generator can assign content filter tags to topic content to identify fragments of a particular topic, such as, for example, a specific term, sentence, paragraph, or the like from that particular topic.

Figure 10A:
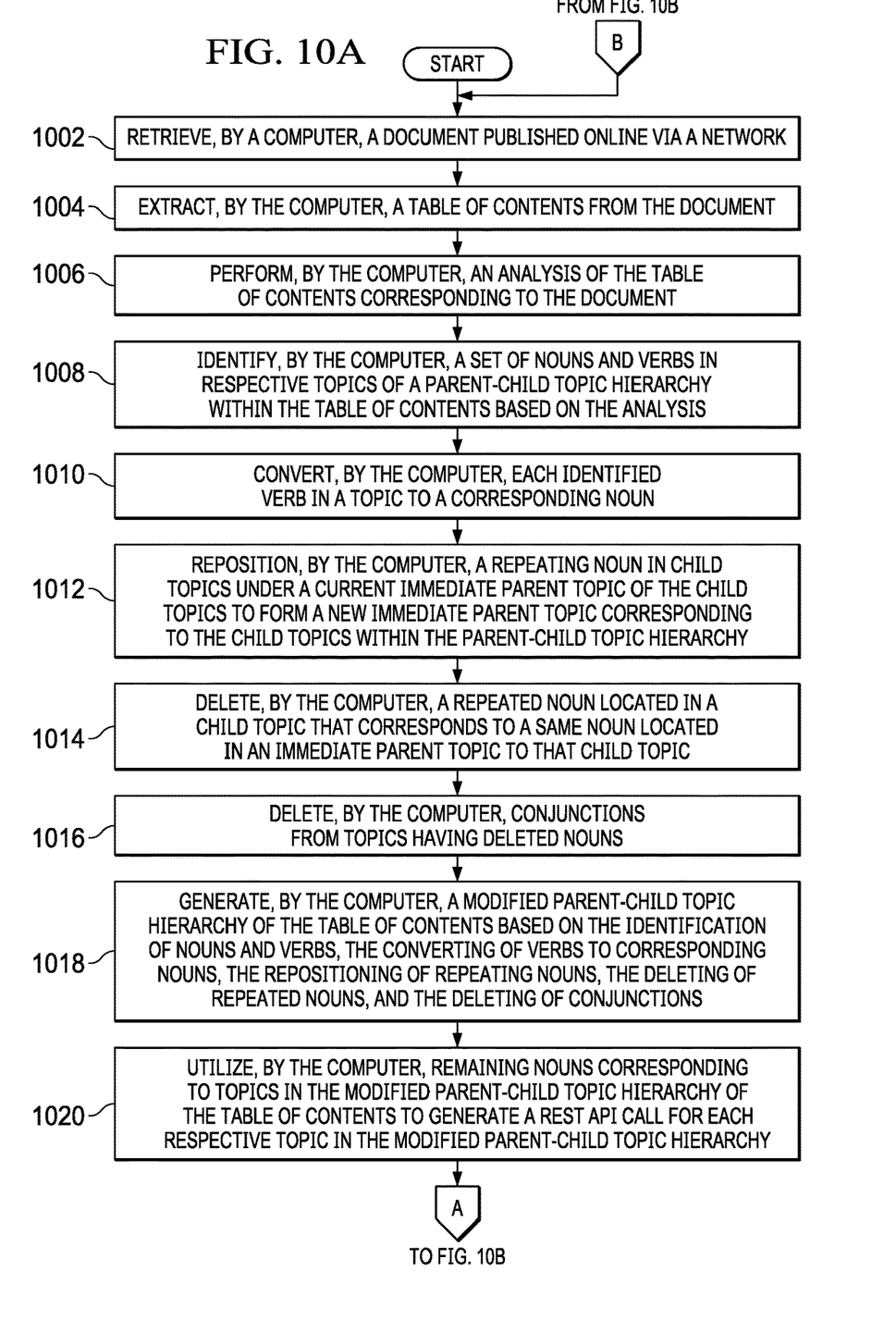
FIGS. 10A-10B are a flowchart illustrating a process for deploying schematically enriched document content as REST APIs in accordance with an illustrative embodiment.
Figure 10B:
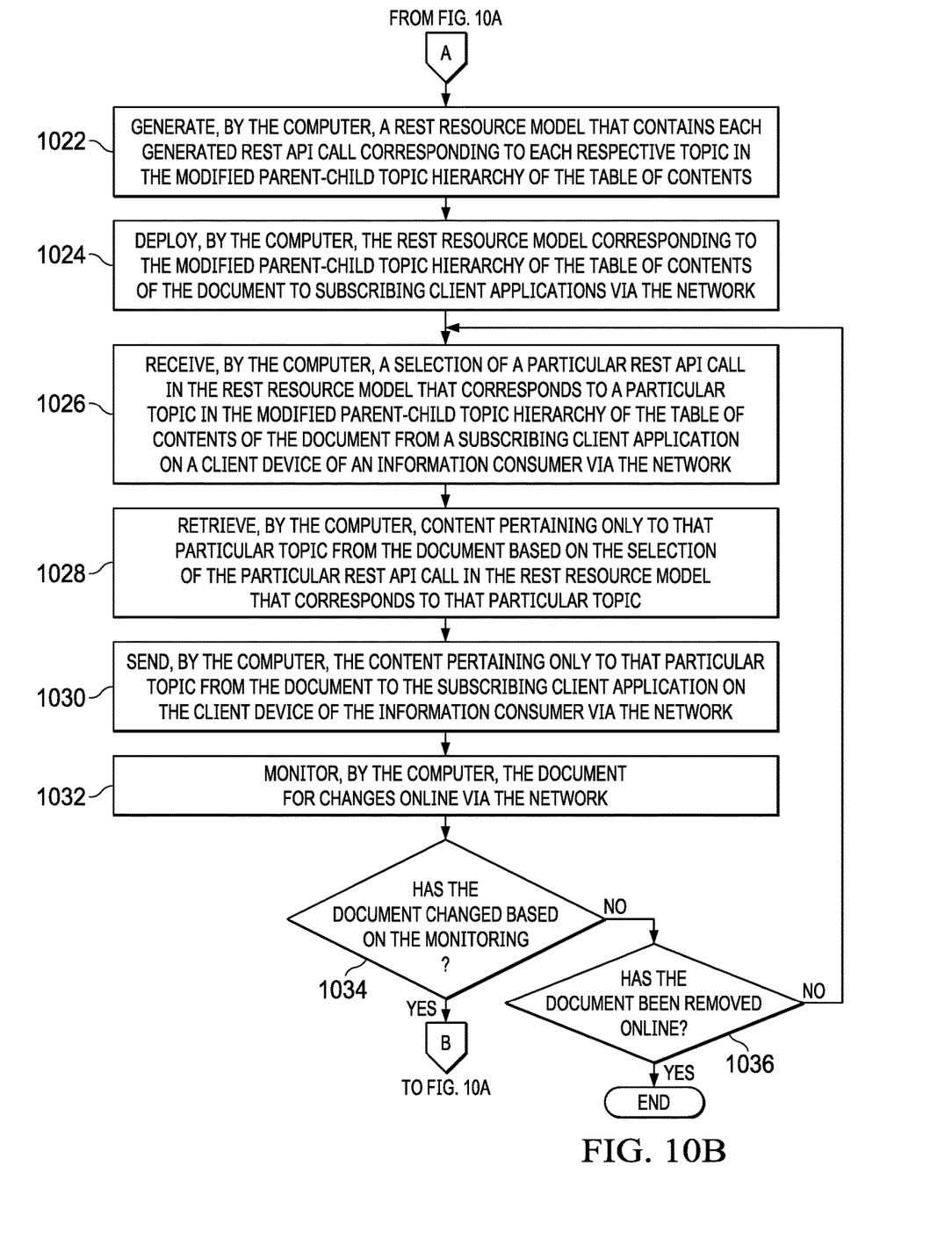

With reference now to FIGS. 10A-10B, a flowchart illustrating a process for deploying schematically enriched document content as REST APIs is shown in accordance with an illustrative embodiment. The process shown in FIGS. 10A-10B may be implemented in a computer, such as, for example, server 104 in FIG. 1 or data processing system 200 in FIG. 2. For example, the process shown in FIGS. 10A-10B may be implemented in REST API generator 218 in FIG. 2.

The process begins when the computer retrieves a document published online via a network (step 1002). The computer extracts a table of contents from the document (step 1004). The computer performs an analysis of the table of contents corresponding to the document (step 1006). The computer performs the analysis of the table of contents using, for example, at least one of parsing, syntax analysis, natural language processing, or the like.

The computer identifies a set of nouns and verbs in respective topics of a parent-child topic hierarchy within the table of contents based on the analysis (step 1008). The computer converts each identified verb in a topic to a corresponding noun (step 1010). The computer also repositions a repeating noun in child topics under a current immediate parent topic of the child topics to form a new immediate parent topic corresponding to the child topics within the parent-child topic hierarchy (step 1012). In addition, the computer deletes a repeated noun located in a child topic that corresponds to a same noun located in an immediate parent topic to that child topic (step 1014). Further, the computer deletes conjunctions from topics having deleted nouns (step 1016).

The computer generates a modified parent-child topic hierarchy of the table of contents based on the identification of nouns and verbs, the converting of verbs to corresponding nouns, the repositioning of repeating nouns in child topics, the deleting of repeated nouns, and the deleting of conjunctions (step 1018). The computer utilizes remaining nouns corresponding to topics in the modified parent-child topic hierarchy of the table of contents to generate a REST API call for each respective topic in the modified parent-child topic hierarchy (step 1020). Afterward, the computer generates a REST resource model that contains each generated REST API call corresponding to each respective topic in the modified parent-child topic hierarchy of the table of contents of the document (step 1022). The computer deploys the REST resource model corresponding to the modified parent-child topic hierarchy of the table of contents of the document to subscribing client applications via the network (step 1024).

Subsequently, the computer receives a selection of a particular REST API call in the REST resource model that corresponds to a particular topic in the modified parent-child topic hierarchy of the table of contents of the document from a subscribing client application on a client device of an information consumer via the network (step 1026). The computer retrieves content pertaining only to that particular topic from the document based on the selection of the particular REST API call in the REST resource model that corresponds to that particular topic (step 1028). The computer sends the content pertaining only to that particular topic from the document to the subscribing client application on the client device of the information consumer via the network (step 1030).

The computer monitors the document for changes online via the network (step 1032). The computer makes a determination as to whether the document has changed based on the monitoring (step 1034). If the computer determines that the document has changed based on the monitoring, yes output of step 1034, then the process returns to step 1002 where the computer retrieves the changed document. If the computer determines that the document has not changed based on the monitoring, no output of step 1034, then the computer makes a determination as to whether the document has been removed online (step 1036). If the computer determines that the document has not been removed online, no output of step 1036, then the process returns to step 1026 where the computer waits to receive another selection of a REST API call in the deployed REST resource model. If the computer determines that the document has been removed online, yes output of step 1036, then the process terminates thereafter.

Thus, illustrative embodiments of the present invention provide a computer-implemented method, computer system, and computer program product for deploying schematically enriched document content as REST APIs. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for deploying schematically enriched document content as Representational State Transfer (REST) Application Programming Interfaces (APIs), the computer-implemented method comprising:
utilizing, by a computer, nouns corresponding to topics in a parent-child topic hierarchy of a table of contents of a document to generate a REST API for each topic in the parent-child topic hierarchy;
generating, by the computer, a REST resource model that contains each generated REST API corresponding to each topic in the parent-child topic hierarchy of the table of contents of the document; and
deploying, by the computer, the REST resource model corresponding to the parent-child topic hierarchy of the table of contents of the document to subscribing client applications via a network.

2. The computer-implemented method of claim 1 further comprising:
receiving, by the computer, a selection of a particular REST API in the REST resource model that corresponds to a particular topic in the parent-child topic hierarchy of the table of contents of the document from a subscribing client application via the network;
retrieving, by the computer, content pertaining to that particular topic from the document based on the selection of the particular REST API in the REST resource model that corresponds to that particular topic; and
sending, by the computer, the content pertaining to that particular topic from the document to the subscribing client application via the network.

3. The computer-implemented method of claim 1 further comprising:
extracting, by the computer, the table of contents from the document; and
performing, by the computer, an analysis of the table of contents corresponding to the document using at least one of parsing, syntax analysis, or natural language processing.

4. The computer-implemented method of claim 1 further comprising:
identifying, by the computer, a set of nouns and verbs in respective topics of the parent-child topic hierarchy within the table of contents.

5. The computer-implemented method of claim 1 further comprising:
converting, by the computer, each identified verb in a topic of the parent-child topic hierarchy to a corresponding noun.

6. The computer-implemented method of claim 1 further comprising:
repositioning a repeating noun in child topics under a current immediate parent topic of the child topics to form a new immediate parent topic corresponding to the child topics within the parent-child topic hierarchy.

7. The computer-implemented method of claim 1 further comprising:
deleting, by the computer, a repeated noun located in a child topic that corresponds to a same noun located in an immediate parent topic to that child topic.

8. The computer-implemented method of claim 1 further comprising:
deleting, by the computer, conjunctions from topics having deleted nouns.

9. The computer-implemented method of claim 1 further comprising:
generating, by the computer, a modified parent-child topic hierarchy of the table of contents based on identification of nouns and verbs, converting verbs to corresponding nouns, repositioning of repeating nouns in child topics, and deleting repeated nouns.

10. A computer system for deploying schematically enriched document content as Representational State Transfer (REST) Application Programming Interfaces (APIs), the computer system comprising:
a bus system;
a storage device connected to the bus system, wherein the storage device stores program instructions; and
a processor connected to the bus system, wherein the processor executes the program instructions to:
utilize nouns corresponding to topics in a parent-child topic hierarchy of a table of contents of a document to generate a REST API for each topic in the parent-child topic hierarchy;
generate a REST resource model that contains each generated REST API corresponding to each topic in the parent-child topic hierarchy of the table of contents of the document; and
deploy the REST resource model corresponding to the parent-child topic hierarchy of the table of contents of the document to subscribing client applications via a network.

11. The computer system of claim 10, wherein the processor further executes the program instructions to:
receive a selection of a particular REST API in the REST resource model that corresponds to a particular topic in the parent-child topic hierarchy of the table of contents of the document from a subscribing client application via the network;
retrieve content pertaining to that particular topic from the document based on the selection of the particular REST API in the REST resource model that corresponds to that particular topic; and
send the content pertaining to that particular topic from the document to the subscribing client application via the network.

12. A computer program product for deploying schematically enriched document content as Representational State Transfer (REST) Application Programming Interfaces (APIs), the computer program product comprising a computer-readable storage medium having program instructions embodied therewith, the program instructions executable by a computer to cause the computer to perform a method of:
utilizing, by the computer, nouns corresponding to topics in a parent-child topic hierarchy of a table of contents of a document to generate a REST API for each topic in the parent-child topic hierarchy;
generating, by the computer, a REST resource model that contains each generated REST API corresponding to each topic in the parent-child topic hierarchy of the table of contents of the document; and
deploying, by the computer, the REST resource model corresponding to the parent-child topic hierarchy of the table of contents of the document to subscribing client applications via a network.

13. The computer program product of claim 12 further comprising:
receiving, by the computer, a selection of a particular REST API in the REST resource model that corresponds to a particular topic in the parent-child topic hierarchy of the table of contents of the document from a subscribing client application via the network;

retrieving, by the computer, content pertaining to that particular topic from the document based on the selection of the particular REST API in the REST resource model that corresponds to that particular topic; and sending, by the computer, the content pertaining to that particular topic from the document to the subscribing client application via the network.

14. The computer program product of claim 12 further comprising:

extracting, by the computer, the table of contents from the document; and performing, by the computer, an analysis of the table of contents corresponding to the document using at least one of parsing, syntax analysis, or natural language processing.

15. The computer program product of claim 12 further comprising:

identifying, by the computer, a set of nouns and verbs in respective topics of the parent-child topic hierarchy within the table of contents.

16. The computer program product of claim 12 further comprising:

converting, by the computer, each identified verb in a topic of the parent-child topic hierarchy to a corresponding noun.

17. The computer program product of claim 12 further comprising:

repositioning a repeating noun in child topics under a current immediate parent topic of the child topics to form a new immediate parent topic corresponding to the child topics within the parent-child topic hierarchy.

18. The computer program product of claim 12 further comprising:

deleting, by the computer, a repeated noun located in a child topic that corresponds to a same noun located in an immediate parent topic to that child topic.

19. The computer program product of claim 12 further comprising:

deleting, by the computer, conjunctions from topics having deleted nouns.

20. The computer program product of claim 12 further comprising:

generating, by the computer, a modified parent-child topic hierarchy of the table of contents based on identification of nouns and verbs, converting verbs to corresponding nouns, repositioning of repeating nouns in child topics, and deleting repeated nouns.

* * * * *